United States Patent
Carty

(10) Patent No.: US 7,260,960 B2
(45) Date of Patent: Aug. 28, 2007

(54) SELECTIVE GLASS BATCHING METHODS FOR IMPROVING MELTING EFFICIENCY AND REDUCING GROSS SEGREGATION OF GLASS BATCH COMPONENTS

(76) Inventor: William M. Carty, 1482 Waterwells Rd., Alfred Station, NY (US) 14803

(*) Notice: Subject to any disclaimer, the term of this patent is extended or adjusted under 35 U.S.C. 154(b) by 375 days.

(21) Appl. No.: 10/927,331

(22) Filed: Aug. 26, 2004

(65) Prior Publication Data

US 2005/0022557 A1   Feb. 3, 2005

(51) Int. Cl.
*C03B 3/00* (2006.01)
*C03B 5/00* (2006.01)
*C03B 5/16* (2006.01)
*C03B 5/18* (2006.01)
*C03B 35/00* (2006.01)

(52) U.S. Cl. .......... 65/135.9; 65/134.1; 65/134.3; 65/178; 65/35

(58) Field of Classification Search ............ 65/27, 65/21.2, 335, 135.9; 501/27, 29; 264/117
See application file for complete search history.

(56) References Cited

U.S. PATENT DOCUMENTS

| | | | | |
|---|---|---|---|---|
| 3,065,090 A | * | 11/1962 | Hopkins .................. 501/29 |
| 3,542,534 A | * | 11/1970 | Yamamoto ................ 65/27 |
| 3,753,743 A | * | 8/1973 | Kakuda et al. ............ 501/31 |
| 3,914,363 A | * | 10/1975 | Bedard et al. ............ 264/105 |
| 3,914,364 A | * | 10/1975 | Engelleitner et al. ....... 264/117 |
| 3,956,446 A | * | 5/1976 | Eirich et al. ............. 264/117 |
| 4,023,976 A | * | 5/1977 | Bauer et al. .............. 501/29 |
| 4,235,618 A | * | 11/1980 | Henry et al. ............. 65/21.1 |
| 4,358,304 A | * | 11/1982 | Froberg ................... 65/27 |
| 4,588,429 A | * | 5/1986 | Hohman et al. ........... 65/27 |
| 5,290,334 A | * | 3/1994 | Alexander ................ 65/335 |
| 6,211,103 B1 | | 4/2001 | Tomaino et al. |
| 6,271,159 B1 | | 8/2001 | Fairchild et al. |
| 6,287,378 B1 | | 9/2001 | Fairchild et al. |
| 6,287,997 B1 | | 9/2001 | Fairchild et al. |
| 6,336,346 B2 | * | 1/2002 | Tomaino et al. ........... 65/21.2 |
| 6,358,870 B1 | * | 3/2002 | Szczesniewski et al. ..... 501/27 |
| 6,420,289 B1 | | 7/2002 | Tomaino et al. |

* cited by examiner

Primary Examiner—Steven P. Griffin
Assistant Examiner—DeMaris R. Wilson
(74) Attorney, Agent, or Firm—C. John Brannon; Sommer Barnard PC

(57) ABSTRACT

A method of controlling reaction paths of glass batch components added to a resident glass melt is provided, including the steps of providing a plurality of raw material batch components according to a batch recipe, selectively combining a portion of the batch components into a first combination material having a melting temperature in a range of 60 to 90% of a resident melt temperature (K) and a viscosity$^3$ a melt viscosity/100, and selectively combining another portion of the batch components into a second combination material having a reaction temperature in a range of 60 to 100% of the resident melt temperature, the second combination material being capable of forming an intermediate compound via a solid state reaction before reacting with the glass melt. The first and second combination materials and any remaining batch components are mixed and introduced into a glass melter.

44 Claims, 8 Drawing Sheets

SELECTIVE GLASS BATCHING METHODS FOR IMPROVING MELTING EFFICIENCY AND REDUCING GROSS SEGREGATION OF GLASS BATCH COMPONENTS

FIELD OF THE INVENTION

The present invention relates to selective batching methods in general and more particularly, to selectively combining particular constituents of a glass batch composition before introducing the batch to the melt in order to reduce the tendency for gross segregation of batch components in the melt and to improve melting efficiency by controlling thermal reaction paths.

BACKGROUND OF THE INVENTION

Conventional glass batching processes are illustrated as a flow diagram in FIG. 1. Typical glass batching usually involves transferring raw materials directly from storage silos into a weigh hopper, weighing the raw materials according to a weight percent (wt %) batch recipe, adding a specified amount of cullet, and mixing the raw batch and the cullet in a large scale mixer. In some cases, the mixer itself functions as a final check-scale for the batch recipe. From the mixer, the mixed batch materials are transferred to one or more hoppers positioned adjacent the end of a glass furnace (melter) where the mixed batch is introduced into the melting tank. Similar batching techniques are nearly universally employed in various glass producing industrial settings, including container glass, fiber-glass, and float glass manufacturing facilities.

After the mixed batch is added to the furnace (melter), uncontrolled reactions are allowed to occur in melter at various temperatures, both among the batch raw material components and between the batch raw material components and resident melt, until a substantially homogenous melt is eventually achieved. The time required for sufficient melting, homogenization and fining is related to the total residence time, or the time that the melt resides within the melter tank before being formed into the desired glass product.

FIG. 2 is a schematic illustration showing the reaction paths that the raw material batch components typically follow when reacting with each other and with the melt already present in the furnace, and FIG. 3 is a schematic illustration showing the conventionally uncontrolled melting stages as the newly added batch melts. See also, for example, F. E. Woolley, "Melting/Fining," Ceramics and Glasses, Engineered Materials Handbook, Vol. 4, ASM International, 1987, pp. 386-393, the entirety of which is incorporated herein by reference.

That is, once the batch is introduced to the furnace, several reactions take place that almost immediately segregate the batch. In float glass production, for example, sodium carbonate ($Na_2CO_3$), calcium carbonate ($CaCO_3$), sodium sulfate ($Na_2SO_4$) and quartz ($SiO_2$) are the most commonly used major raw materials. When water has not been added in an effort to reduce batch segregation in the storage hopper, the first reaction is usually the formation of a eutectic liquid by the reaction of $Na_2CO_3$ and $CaCO_3$ at a temperature of around 785° C.

As shown in FIG. 2, $Na_2CO_3$ and $CaCO_3$ react along reaction Path 1, creating a low viscosity eutectic liquid with a quantity of un-reacted $CaCO_3$. This low viscosity eutectic liquid reacts with residual $CaCO_3$ and quartz along reaction Path 2 to eventually achieve the overall composition of the glass dictated by the batch recipe. An example of a typical float glass composition is approximately 73.5 wt. % $SiO_2$, 12.3 wt. % CaO, and 14.2 wt. % $Na_2O$.

Similar reactions are observed between $Na_2CO_3$, $CaCO_3$, and $Na_2SO_4$. In this case, the eutectic liquid is composed of molten salts having a very low viscosity. That is, the eutectic liquid flows easily, and exhibits flow properties similar to those exhibited by water, which has a viscosity in a range of 1 to 4 mPa.s, or 1 to 4 centipoise. The eutectic liquid reacts with the quartz to eventually provide a homogeneous glass of the desired composition. The formation of this eutectic liquid, however, can increase the tendency for batch segregation and effectively reverse the efforts of batch mixing.

Similar reactions occur in container glass compositions, and in the case of fiber-glass production, borates exhibit similar problems in the initial stages of melting. This segregation process leads to the formation of large-scale domains, or agglomerates, of nearly pure silica that then require excessively long residence times for dissolution into the surrounding liquid melt. This initial segregation then requires re-homogenization within the glass tank prior to forming.

Direct evidence of "de-mixing" can be seen in a glass tank during the melting process. Agglomerations (scaled on the order of cm in length) of batch raw materials, commonly referred to in the industry as batch logs, can be seen in various states of melting in the glass tank. Moreover, the phenomenon of large-scale batch segregation in the melter tank is commonly seen in finished glass in the form of defects such as stones, which are mostly composed of undissolved quartz; seeds, which are bubbles that are not liberated from the melt during fining; and cord lines, which are optical distortions caused by local differences in composition. These defects are direct evidence of off-composition glass due to batch de-mixing or incomplete re-mixing that decrease the overall material efficiency and reduce the quality of the final product. Industrial observations are further supported by technical publications, which also recognize that batch segregation is commonly observed in commercial production. Despite the fact that batch segregation in the glass tank and the potential defects that can result therefrom are recognized in the industry, and despite a long felt need to reduce this undesirable behavior and improve melting efficiency and overall quality, the glass industry has not yet successfully addressed these issues with a viable commercial solution.

As mentioned above, material efficiency in glass making is related to reducing losses due to defects such as stones, seeds, and cord lines. Stones are silica particles or agglomerates that have not fully reacted with the melt. This type of stone can be reduced by reducing segregation of refractory silica from flux materials. Seeds, which are bubbles that result from incomplete fining, can be reduced by maximizing the evolution of volatiles early in the melting process and by reducing air trapped in pore spaces. While cullet from some defective glass can be recycled through the process (though glass with stones cannot be recycled), it is more efficient to reduce in-house cutlet from defective glass.

In large scale commercial glass production (e.g., float glass, container glass, and fiber-glass) where the melting tank volumes are considerably greater (accommodating volumes on the order of tons of molten glass), in situ melt mixing is accomplished by convection currents within the tank and by the movement of evolved gases from decomposition of raw materials. While some mixing and fining is required to remove gaseous bubbles, the expensive and energy intensive processes to improve the mixing of the molten batch can also be attributed to large scale segregation of batch materials.

Considering that physical mixing is but a minor factor, the efficiency of the melting process is therefore directly related to diffusion or reactions at the quartz-liquid interface. Quartz dissolution is limited by the initial reaction of quartz with the low viscosity eutectic liquid. As the melting progresses, the quartz interacts with a liquid that is steadily increasing in silica content and subsequently, viscosity. Therefore, high temperatures are needed within the melting tank to ensure reasonable diffusion rates and reasonable homogeneity. As mentioned above, the residence time of the material in a tank is determined by the time it takes for the batch materials to completely melt and for the resulting liquid to homogenize. In a continuous production situation, the mass of molten glass in the furnace is held constant, and commercially, the minimum mean residence time is of the order of 24 hours of production for container furnaces and 72 hours for float glass furnaces with roughly half of this time devoted to melting, with the other half devoted to fining.

One attempt to improve the batch melting process involved reducing the addition of carbonate and quartz in the raw (unmixed) form. Experiments were conducted using synthetic diopside ($CaO.MgO.2SiO_2$) instead of a mixture of $CaCO_3$, $MgCO_3$, and quartz. The results showed that the time required to completely dissolve the original batch (i.e., the batch free time) was reduced depending on temperature, and there was also a reduction in fining time. These improvements were attributed to a reduction in the amount of quartz that needed to be dissolved. See, for example, C. C. Tournour and J. S. Shelby, "Effect of Diopside and Wollastonite on the Melting of Soda-Lime-Silicate Glasses," *Ceramic Engineering and Science Proceedings*, edited by J. Kieffer, American Ceramic Society, 21 [1], 263-273 (2000), the entirety of which is incorporated herein by reference.

It is also conventionally believed that melting is promoted by keeping the viscosity low. As described above, however, the uncontrolled production of low viscosity liquids during the melting process contributes to undesirable batch segregation. Although a melt that fosters lower viscosities overall may improve quartz dissolution and diffusion rates during melting, these benefits can only be achieved after the highest melting point batch components are sufficiently melted and any batch agglomerates are fully reacted in the melt. Thus, in order to improve melting efficiency and reduce the above-described problems associated with de-mixing and segregation, substantial improvements with respect to controlling the glass batch melting behavior are desired.

Another problem with conventional glass making technology lies in the amount of energy required to maintain a continuous glass melting operation, and the environmental impact of the use of fossil fuel to provide this energy. Fuel can constitute 25-30% of the cost of manufacturing float glass. The volatility of fuel prices can, of course, at times increase this proportion without warning.

Nationwide, the U.S. glass industry uses in excess of 250 trillion BTU annually to produce approximately 21 million tons of glass products; approximately 80% of this energy is supplied by natural gas. Melting one ton of glass should theoretically require only about 2.2 million BTU, but in reality it can range from 4.7 to 6.9 million BTU per ton due to losses and inefficiencies. Because 80% or more of the overall energy used in container glass, fiber-glass, and float glass manufacturing is needed to operate the melting and fining operations, an energy reduction in glass manufacturing through more efficient melting would be desirable. For example, if a float glass plant producing 400 tons/day of flat glass runs 365 days/year, even the most efficient natural gas-fired plant (4.7 million BTU/ton) consumes approximately 686 billion BTU/year, or 686 million cubic feet of natural gas. See, for example, U.S. Department of Energy, Office of Industrial Technology, 1997, and "Integrated Pollution Prevention Control (IPPC)," *Reference Document on Best Available Practices in the Glass Manufacturing Industry*, European Commission, Institute for Prospective Technological Studies, Seville, 2000, the entireties of which are incorporated herein by reference.

Pollution prevention and the considerable costs associated with regulatory compliance, as well as improving the overall energy and material efficiency are critical for reducing the negative environmental impact of glass manufacturing and for making glass manufacturing more economically competitive. For example, a typical float glass plant must spend an average of $2 million dollars for new environmental control systems and about 2.5% of total manufacturing costs on compliance. (See, for example, "Glass: A Clear Vision for a Bright Future," U.S. Department of Energy, 1996, the entirety of which is incorporated herein by reference). Thus, a reduction in 10% of the natural gas use in a typical float plant would result in a savings of approximately $285,000 per year in natural gas (assuming $5/MMBtu). Moreover, reductions in compliance costs associated with additional chemical treatments and operational implementations aimed at reducing pollutant emissions from combustion reactions could also be realized in conjunction with a reduction in the amount of fuel consumed.

Air pollutants emitted from glass industry include:

| | |
|---|---|
| 1) Nitrogen oxides ($NO_x$) | 2) Sulfur oxides ($SO_x$) |
| 3) Carbon monoxide (CO) | 4) Carbon Dioxide ($CO_2$) |

Fossil fuels used for combustion are the typically the sources of $NO_x$ and some $CO_x$. The decomposition of carbonate and sulfate raw materials contributes $CO_x$ and $SO_x$ emissions, respectively. Reducing the residence time, however, reduces the amount of fuel burned per unit of glass produced and improves energy efficiency, which also fosters reduced amounts of emissions such as $NO_x$ and fuel-derived $CO_2$ and CO per unit of glass produced.

Residence time is related to the time required to fully melt all of the batch components, and is particularly dependent upon the amount of high-melting point batch components (e.g., silica) in the batch recipe. Although it would be desirable to eliminate free quartz as a raw material additive due to its slow reactivity and high melting point, quartz remains an abundant and economical source of silica, which is a major component of many commercial glass systems. Therefore, it would be more desirable to reduce the amount of free quartz added by obtaining a portion of the silica from selectively combined binary or ternary mixtures that are either pelletized together, pre-reacted or pre-melted prior to batching and being introduced into the resident melt, which is heretofore unknown in the glass industry.

Thus, it would be desirable to provide a method for controlling the melting behavior (i.e., reaction paths) of glass batch components within a resident melt to improve melting efficiency, such that the improved melting efficiency enables a decrease in energy usage, reduces the need for chemical fining agents that contribute to air pollutants and raw material cost, decreases pollution while ultimately producing higher quality, lower cost glass products and reduces the occurrence of batch de-mixing and segregation in early melting stages.

SUMMARY OF THE INVENTION

It is an object of the present invention to overcome the drawbacks associated with the conventional glass batching and melting methods. Particularly, it is an object of the present invention to provide a method for selectively pre-combining certain components of a glass batch recipe prior to introducing the overall batch composition into a furnace melting tank to control the melting reactions (i.e., reaction paths) within the tank in order to improve melting efficiency.

In conjunction with improved melting efficiency, it is also an object of the present invention to facilitate decreased energy usage, reduce the need for chemical fining agents that contribute to air pollutants and raw material cost, decrease pollution and ultimately produce higher quality, lower cost glass products, and reduce gross segregation of raw material batch constituents during melting.

According to one embodiment of the present invention, a method of controlling the reaction paths of glass batch components added to a glass melt residing in a glass melter is provided. The glass melt has a melt viscosity ($\eta_m$) at a resident melt temperature ($T_m$), measured on an absolute temperature scale (i.e., Kelvin). The method includes the steps of providing a plurality of raw material batch components in amounts according to a batch recipe, wherein the plurality of raw material batch components include at least one of a glass-former material and at least one of a modifier (flux) material. A first portion of the plurality of raw material batch components is selectively combined to provide a first combination material having a melting temperature which is in a range of 60 to 90% of the resident melt temperature $T_m$ and a viscosity at the melting temperature that is greater than or equal to the melt viscosity $\eta_m/100$. A second portion of the plurality of raw material batch components is also selectively combined to provide a second combination material having a reaction temperature in a range of 60 to 100% of the resident melt temperature, such that the second combination material is capable of forming an intermediate compound via a solid state reaction prior to reacting with the glass melt. The first combination material, the second combination material and any remaining portion of the plurality of raw material batch components are mixed together to form a batch mixture, and the batch mixture is introduced into the glass melter.

The first combination material can be provided in various forms. For example, according to one aspect of the first embodiment of the present invention, the first combination material can be provided as a plurality of discrete reaction members formed by pelletizing the first combination material prior to the introducing step, wherein reaction member has a composition based on the first combination material. Alternatively, the first combination material can be provided as a pre-reacted material formed by pre-reacting the first combination material to a temperature proximate a specific reaction temperature of the first combination material, cooling the pre-reacted first combination material, and grinding the pre-reacted first combination material to form a plurality of pre-reacted particulates prior to the introducing step. In this case, each of the plurality of pre-reacted particulates has a composition based on the first combination material. According to yet another alternative, the first combination material can be provided as a frit formed by heating the first combination material to a temperature proximate a melting temperature of the first combination material, melting the first combination material and quenching the first combination material to form the frit prior to the introducing step. In this case, as with the discrete reaction members and the pre-reacted particulates, the frit has a composition according to the first combination material.

Similarly, the second combination material can be provided in a variety of forms. For example, according to another aspect of the first embodiment of the present invention, the second combination material can be provided as a plurality of discrete reaction members formed by pelletizing the second combination material prior to the introducing step, wherein the reaction member has a composition based on the second combination material. Alternatively, the second combination material can be provided as a pre-reacted material formed by pre-reacting the second combination material to a temperature proximate a specific reaction temperature of the second combination material, cooling the pre-reacted second combination material, and grinding the pre-reacted second combination material to form a plurality of pre-reacted particulates prior to the introducing step. In this case, each of the plurality of pre-reacted particulates has a composition based on the second combination material. According to yet another alternative, the second combination material can be provided as a frit formed by heating the second combination material to a temperature proximate a melting temperature of the second combination material, melting the second combination material and quenching the second combination material to form the frit prior to the introducing step. In this case, as with the discrete reaction members and the pre-reacted particulates, the frit has a composition according to the second combination material.

The plurality of raw material batch components of the present invention can also include an intermediate material, in addition to the at least one glass-former material and the at least one modifier material. It should be noted that since the present invention can be applied equally well for any type of glass manufacturing, the exact composition of the combination materials will vary according to the batch recipe used in the particular field of glass making. For example, typical soda lime silicate float glass compositions do not include an intermediate material, such as alumina or zirconia, and instead include a plurality of modifiers, such as sodium and calcium, in various carbonate and oxide forms, depending upon the raw materials from which they are derived.

For glass compositions that include an intermediate material, the first combination material can include at least a portion of the intermediate material and at least a portion of at least one of the modifier materials, and the second combination material can include at least a portion of at least one of the glass-former material and at least a portion of at least one of the modifier material. Additionally, the second combination material can include at least a portion of the intermediate material and at least a portion of at least one of the modifier materials, and the first combination material can at least a portion of at least one of the glass-former material and at least a portion of at least one of the modifier material. Ternary sub-systems created by selective batching methods according to the present invention, rather than binary sub-systems, are particularly applicable when dealing with glasses containing significant levels of alumina.

Although the exact composition of the combination materials can vary according to the particular application, the general combinations of raw material batch components according to the present invention remains constant. That is, the first combination material can include at least a portion of at least one of the glass-former materials and at least a portion of at least one of the modifier materials, and the second combination material can include at least a portion of at least one of the glass-former materials and at least a portion of another of the modifier materials.

The term "glass-former material" or glass-former refers to materials which have a $M_xO_y$ oxide form (where x=1 or 2; y=1-5) and a single O-M bond strength on the order of 80-120 kcal. The glass-former material can be included as a batch component raw material in its oxide form, or can be the product of calculated decomposition reactions of other batch component raw materials, such as carbonates, hydroxides, chlorides, nitrates, sulfides, or multi-component industrial minerals. Glass-formers according to the present invention can include, for example, oxide forms of Be, Ge, Si, P, and B.

The term "intermediate material" or intermediate refers to materials which have a $M_xO_y$ oxide form and a single O-M bond strength on the order of 60-75 kcal. The intermediate material can be included as a batch component raw material in its oxide form, or can be the product of calculated decomposition reactions of other batch component raw materials, such as carbonates, hydroxides, chlorides, nitrates, sulfides, or multi-component industrial minerals. Intermediates according to the present invention can include, for example, oxide forms of Mn, Mg, Zr, Be, Fe, Al and Ti.

The term "modifier material" refers to materials which have a $M_xO_y$ oxide form and a single O-M bond strength on the order of 10-60 kcal, and which substantially perform as fluxing materials during thermal reactions. The modifier material can be included as a batch component raw material in its oxide form, or can be the product of calculated decomposition reactions of other batch component raw materials, such as carbonates, hydroxides, chlorides, nitrates, sulfides, or multi-component industrial minerals. Intermediates according to the present invention can include, for example, oxide forms of K, Na, Li, Ba, Pb, Sr, Ca, Mg, Mn, and Fe.

It should be noted that, according to the present invention, modifiers should not be selectively combined with other modifiers in the absence of a glass-former or an intermediate, due to the reactive nature (i.e., fluxing behavior) of modifiers. That is, a combination material formed from a modifier-modifier selective combination would not reduce the occurrence of batch segregation due to modifiers' tendency to form low viscosity eutectic liquid at lower temperatures.

It should also be noted that, according to the present invention, intermediates and glass-formers should not be selectively combined without a modifier to reduce the melting temperature of the combination material. That is, an intermediate-glass-former selective combination would not yield any significant benefits with respect to narrowing the melting temperature range of the batch components and would not exhibit the desired viscosity in the temperature range of the present invention. Nor would beneficial solid state reactions occur in lieu of melting. Instead, the combination material would simply require a longer residence time for melting and homogenization with the resident melt, which decreases the overall melting efficiency.

As mentioned above, there are three preferred forms in which each combination material can be stabilized prior to being mixed with other combination materials and any remaining portions of the batch (e.g., cullet or previously uncombined weight percentages of the glass-formers, modifiers or, if included, intermediates). The present invention provides method for selectively batching the raw material batch components wherein the first combination material and the second combination material comprise the same or different forms.

For example, according to one aspect of the first embodiment of the present invention, the first combination comprises a plurality of discrete reaction members and the second combination material comprises a plurality of discrete reaction members. Thus, in this case, each of the first and second combination materials are selectively pre-mixed and pelletized to form a pelletized feed stock prior to being mixed with each other and the remaining batch components and being added to the melter. Additionally, according to another aspect of the first embodiment of embodiment of the present invention, the first combination material comprises a plurality of discrete reaction members and the second combination material comprises a pre-reacted material. Further, according to yet another aspect of the first embodiment of embodiment of the present invention, the first combination material comprises a plurality of discrete reaction members and the second combination material comprises a frit.

The present invention also provides that the first combination material comprises a pre-reacted material and the second combination material comprises a plurality of discrete reaction members. Alternatively, the present invention provides that the first combination material comprises a pre-reacted material and the second combination material comprises a pre-reacted material. Thus, in this case, each of the first and second combination materials are selectively pre-mixed and pre-reacted and ground to form a particulate feed stock material prior to being mixed with each other and the remaining batch components and before being added to the melter. Further, the present invention provides that the first combination material comprises a pre-reacted material and the second combination material comprises a frit.

Further, according to another aspect of the first embodiment of the present invention, the first combination material comprises a frit and the second combination material comprises a plurality of discrete reaction members. Alternatively, the present invention provides that the first combination material comprises a frit and the second combination material comprises a pre-reacted material. Moreover, according to yet another aspect of the first embodiment of the present invention, the first combination material comprises a frit and the second combination material comprises a frit. Thus, in this case, each of the first and second combination materials are selectively pre-mixed and pre-melted and quenched to form a frit feed stock material prior to being mixed with each other and the remaining batch components and before being added to the melter.

Selectively batching raw materials into mixtures (i.e., the first combination material of the first embodiment) that form higher viscosity "endpoints," to control the melting sequence and consequently the viscosity of the molten phase(s), instead of simply mixing all of the batch components together prior to charging, controls the reaction paths within the melter, rather than allowing the melting process to dictate the composition of the melt at various stages. That is, if all of the batch constituents possessed melting points within a narrow temperature range, more uniform melting could be achieved, segregation (regardless of magnitude) would be limited, and the time required for homogenization substantially reduced. Furthermore, if de-mixing is eliminated, diffusion distances are shortened and batch free time would be dramatically reduced.

Selectively batching raw materials into a mixture (i.e., the second combination material of the first embodiment) that is capable of forming an intermediate compound that will react in a series of solid state reactions with the glass melt and the other components of the glass batch rather than melting, even at temperatures approaching the resident glass melt temperature, prevents the formation of low viscosity eutectic compounds that can increase the tendency for batch segregation. Further, since the intermediate compound does not itself melt per se, the above-mentioned viscosity considerations are rendered moot in view of the solid-state reactions that instead yield in a glass melt having a desired composition with improved melting efficiency, for example, by reducing the tendency for the segregation complications that reduce melting efficiency.

The selective batching techniques according to the present invention alter the reaction sequence during the melting process to create intermediate reaction products that are then more easily reacted with each other, improve melting efficiency, and thus significantly reduce the overall energy needs and time required to form a homogeneous melt. The tendency for large scale segregation can also be reduced (i.e., substantially eliminated), thus providing shorter diffusion distances. This, in turn, eliminates the need for downstream mechanical mixing of the melt, such as mechanical stirring, or other physical implementations to improve melting efficiency, for example, bubblers designed to increase the heat capacity of the melt. The time required for sufficient melting and homogenization is substantially reduced, and fining times can be reduced, as well. In lieu of reducing the residence time, however, it is also possible to allow for additional fining time in the current furnace setup, that is, if the overall residence time is maintained.

Controlling the reaction paths of batch components to improve melting efficiency reduces the residence time of material in the glass tank and reduces the batch-free time, as well. This, in turn, reduces the amount of energy required per unit of glass during production. For example, if residence time of material in the tank can be reduced by 10% to 20%, a hypothetical float glass plant could reduce the annual natural gas use by 57 to 114 million cubic foot (for the most efficient 4.7 million BTU per ton), assuming that 83% of the total energy is used for melting. On a nationwide scale of all glass manufacturing, a 10% reduction in residence time could result in a savings of 20 trillion BTU or 16 billion cubic foot of natural gas (assuming 250 trillion BTU, 80% natural gas usage and $1 \times 10^3$ BTU per cubic foot natural gas).

Sulfur oxides are a decomposition product of saltcake (sodium sulfate) that is added to the batch as a fining agent. The improved melting efficiency attributed to the present invention reduces the need for fining agents such as saltcake ($Na_2SO_4$) and thus, directly reduce $SO_x$ emissions. Reducing these and other harmful emissions reduces the need for and costs of compliance (e.g., implementation measures and/or compliance failure fines) with environmental emission standards.

According to a second embodiment of the present invention, a method of controlling the reaction paths of glass batch components added to a glass melt residing in a glass melter is provided. The glass melt has a melt viscosity $\eta_m$ at a resident melt temperature $T_m$, measured on an absolute temperature scale (i.e., Kelvin). The method includes the steps of providing a plurality of raw material batch components in amounts according to a batch recipe, wherein the plurality of raw material batch components include at least one of a glass-former material and at least one of a modifier material. The method also includes the steps of selectively combining a first portion of the plurality of raw material batch components to provide a first combination material having a melting temperature which is in a range of 60 to 90% of the resident melt temperature $T_m$ and a viscosity at the melting temperature which is greater than or equal to the melt viscosity $\eta_m/100$, and mixing the first combination material and any remaining portion of the plurality of raw material batch components to form a batch mixture. The batch mixture is then introduced into the glass melter.

According to this second embodiment of the present invention, the method further includes a step of selectively combining a second portion of the plurality of raw material batch components to provide a second combination material having a melting temperature which is in a range of 60 to 90% of the resident melt temperature $T_m$ and a viscosity at the melting temperature that is greater than or equal to the melt viscosity $\eta_m/100$. The second combination material is mixed with the first combination material and any remaining portion of the plurality of raw material batch components to form a batch mixture, which is then introduced into the glass melter.

It should be noted that this embodiment of the present invention is primarily directed to selectively combining the raw material batch components to narrow the melting point range of the added batch and to control the viscosity of the added batch during melting to improve the melting efficiency and prevent batch segregation, as described above with respect to the first embodiment.

Different combinations of raw material batch components to form the first and second combination materials according to the second embodiment of the present invention are similar to those described above with respect to the first embodiment, and further redundant description thereof is therefore omitted. Likewise, the different forms in which the first and second combination materials according to the second embodiment of the present invention can be stabilized prior to being mixed with each other and with any remaining batch components are similar to those described above with respect to the first embodiment, and further redundant description thereof is therefore omitted.

According to a third embodiment of the present invention, a method of controlling the reaction paths of glass batch components added to a glass melt residing in a glass melter is provided. The glass melt has a melt viscosity $\eta_m$ at a resident melt temperature $T_m$, measured on an absolute temperature scale (i.e., Kelvin). The method includes the steps of providing a plurality of raw material batch components in amounts according to a batch recipe, wherein the plurality of raw material batch components including at least one of a glass-former material and at least one of a modifier material. The method also includes the steps of selectively combining a first portion of the plurality of raw material batch components to provide a first combination material having a reaction temperature in a range of 60 to 100% of the resident melt temperature, such that the first combination material is capable of forming an intermediate compound via a solid state reaction prior to reacting with the glass melt and mixing the first combination material and a remaining portion of the plurality of raw material batch components to form a batch mixture. The batch mixture is then introduced into the glass melter.

According to this third embodiment of the present invention, the method further includes a step of selectively combining a second portion of the plurality of raw material batch components to provide a second combination material having a reaction temperature in a range of 60 to 100% of the resident melt temperature, such that the second combination material is capable of forming an intermediate compound via a solid state reaction prior to reacting with the glass melt. The second combination material is mixed with the first combination material and any remaining portion of the plurality of raw material batch components to form a batch mixture, which is then introduced into the glass melter.

It should be noted that this third embodiment of the present invention is primarily directed to selectively combining portion of the raw material batch into a combination material that is capable of forming an intermediate compound via a solid state reaction with the glass melt within a certain temperature range of the resident melt temperature to improve the melting efficiency and prevent batch segregation, as described above with respect to the second combination material of the first embodiment.

Different combinations of raw material batch components to form the first and second combination materials according to the third embodiment of the present invention are similar to those described above with respect to the first embodiment, and further redundant description thereof is therefore omitted. Likewise, the different forms in which the first and second combination materials according to the third embodiment of the present invention can be stabilized prior to being mixed with each other and with any remaining batch components are similar to those described above with respect to the first embodiment, and further redundant description thereof is therefore omitted.

BRIEF DESCRIPTION OF THE DRAWINGS

For a better understanding of the nature and objects of the present invention, reference should be made to the following drawings, in which.

DETAILED DESCRIPTION OF THE INVENTION

According to the present invention, selective blending of particular combinations of batch raw materials according to the overall batch recipe is performed (hereinafter also referred to as "selective batching"), rather than the complete blending of the entire batch composition prior to introduction to a glass melter (e.g., furnace tank) having molten glass (hereinafter referred to as "melt") residing therein. Selectively batching in this manner provides intermediate batch reaction products whose thermal characteristics (i.e., melting point) and rheological properties (i.e., viscosity) or high temperature reaction behaviors improved melting efficiency and reduce the occurrence of batch constituent segregation (regardless of magnitude) during the initial melting stages.

Figure 1:
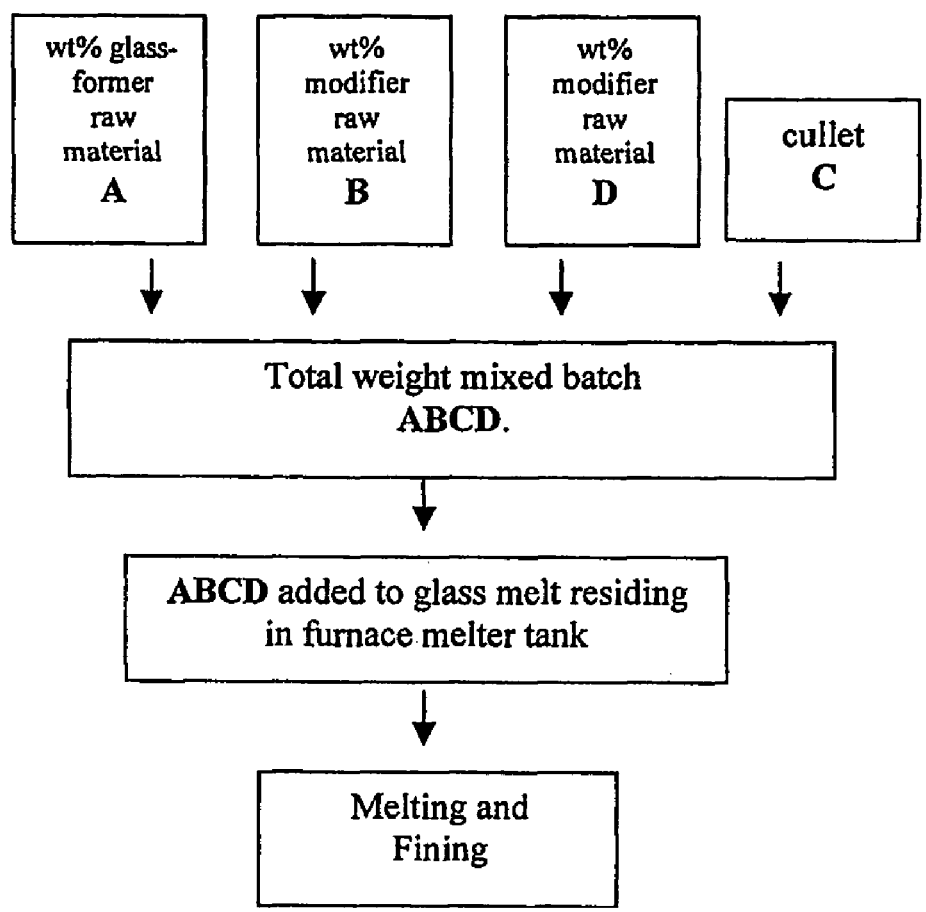
FIG. 1 is a flow diagram illustrating conventional glass batching techniques.
Figure 2:
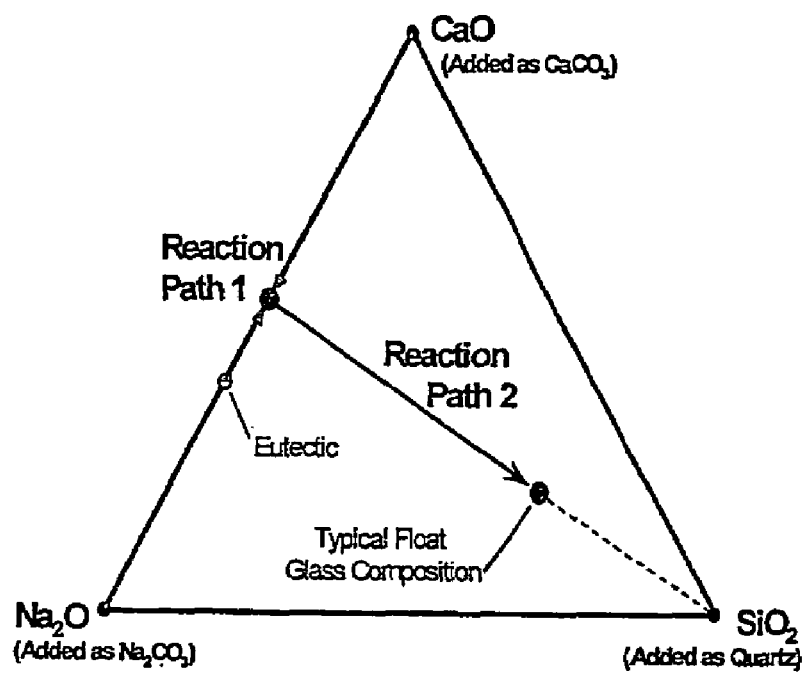
FIG. 2 is a schematic illustration of the conventional batch reaction paths for a typical commercial float glass composition.
Figure 3:
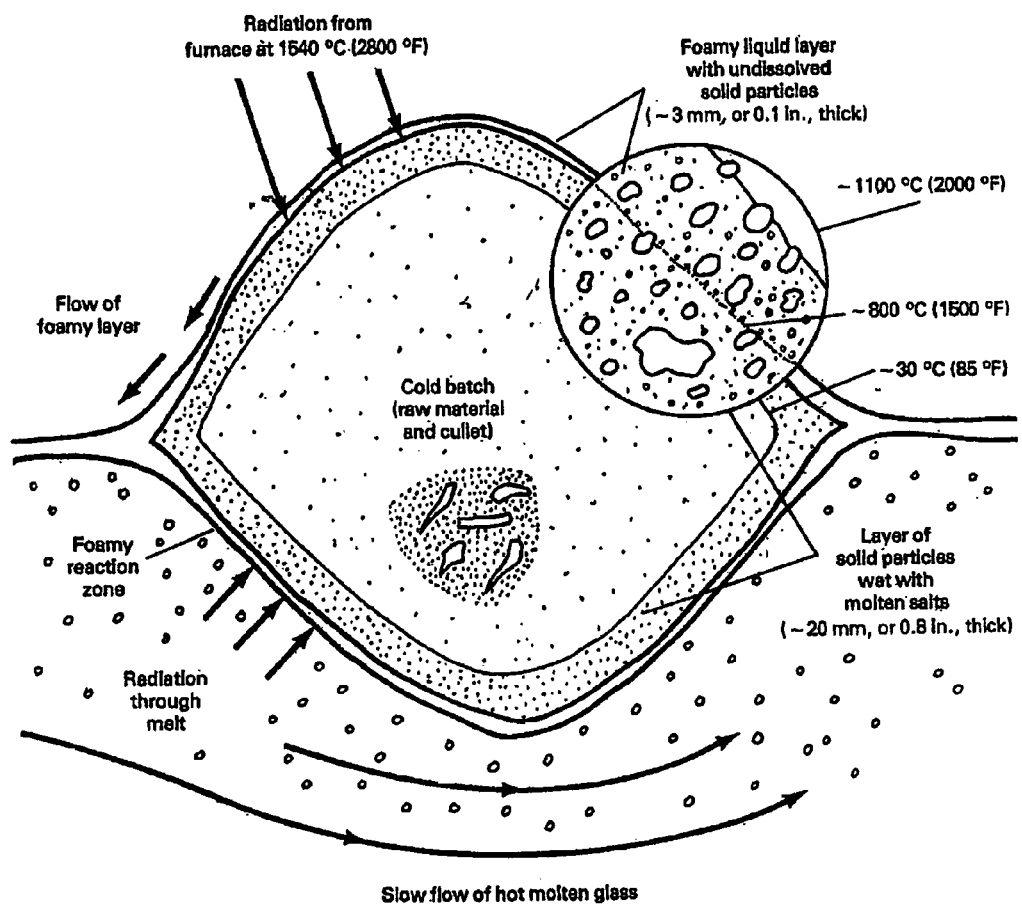
FIG. 3 is a schematic diagram illustrating a conventional batch reaction process.
Figure 4:
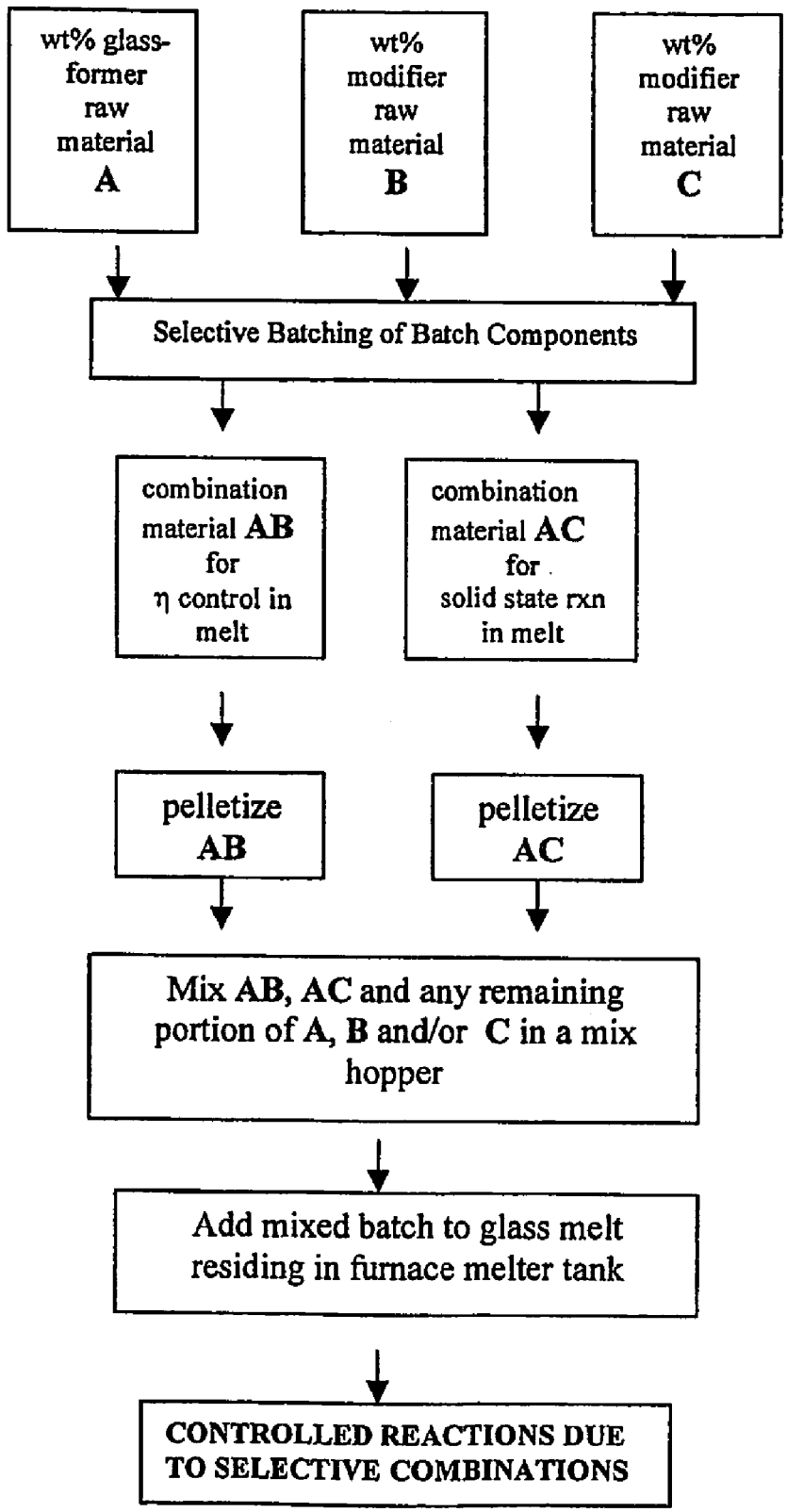
FIG. 4 is a flow diagram illustrating a first embodiment of the selective glass batching method according to the present invention.

As shown in the flow diagram in FIG. 4, one embodiment of the present invention is directed to narrowing the melting point range of the batch constituents by selectively combining a first portion of the batch components such that the selective combination exhibits the desired Theological properties (i.e., increased viscosity) in the molten phase formed during the narrowed melting point range. Additionally, a second portion of the batch components are selectively combined such that the selective combination has a specific reaction temperature range wherein an intermediate compound is formed via a solid state reaction between the combination and the resident melt.

Stabilizing the form of the new combination form of the selectively combined batch components can be accomplished in various ways which themselves have various levels of energy requirements: selectively batch and pelletize to form small "reaction members" that react initially to form an intermediate reaction product; pre-react selective batch components to form an intermediate feedstock; or pre-melt selective batch components as an intermediate feedstock.

FIG. 4 shows that the batch recipe calls for a specified wt % of glass-former A, modifier B and modifier C. At least a portion of glass-former A and at least a portion of modifier B are selectively combined on a wt % basis to form a first combination material AB that will have a melting temperature $T_{AB}$ in a range of 60-90% of the resident melt temperature $T_m$ and a viscosity $\eta_{AB} \geq$ the resident melt viscosity $\eta_m/100$. Preferably, $\eta_{AB}$ is in a range of 150 centipoise to 15,000 centipoise, although viscosities exceeding 15,000 centipoise are not outside the scope of the present invention. The preferred viscosity $\eta_{AB}$ of the first combination material can also be expressed as being at least 1% of $\eta_m$. It should be noted that the viscosities of the above-mentioned conventionally encountered low viscosity eutectic liquids that contribute to batch segregation (and are thus to be avoided) are considerably less than 1% of the viscosity of the resident melt. For example, the viscosity of the eutectic liquid formed by the reactions between $CaCO_3$ and $Na_2CO_3$ is approximately 0.03% of the viscosity of the resident melt.

It should also be noted that although $T_m$ is preferably expressed in terms of Kelvin (i.e., an absolute temperature scale), $T_m$ can also be expressed by other units for measuring temperature, for example, degrees Celcius (°C.). Although the different temperature scales can be compared to one another using common conversion factors, for purposes of establishing the relationship between the resident melt temperature and the temperature ranges over which the selectively combined batch components either melt or react according to the present invention, the absolute temperature scale is preferred.

Similarly, at least another portion of glass-former A and at least a portion of modifier C are selectively combined on a wt % basis to form a second combination material AC that will have a reaction temperature $T_{AC}$ in a range of 60-100% of the resident melt temperature $T_m$ such that melt homogenization and diffusion will occur via solid state reactions rather than by melting the second combination material AC. Each of the first AB and second AC combination materials are then pelletized.

It is important to note that the present invention does not involve pelletizing as a batching step per se, rather, pelletized batching techniques are simply one of three methods used to keep the selectively batched components together in the form of the respective combination materials as they are introduced into the furnace. Although batch pelletizing is known in the art, typical pelletizing practices relate to pelletizing the entire batch, rather than selectively pelletizing portions of the batch in specific compositional ratios in order to control the melting reactions in the tank. Technical publications and industrial practices strongly support that selective pelletizing of particular batch components has been unheard of heretofore.

Pelletized AB, pelletized AC, and any remaining portions of A, B and/or C are then mixed in a mix hopper, for example, and then added to a melter. It should also be noted that AB and AC can also be pre-reacted or pre-melted. Controlled reactions occur in the melter at various temperatures between the selectively combined batch raw material components AB and AC and the resident melt, until a substantially homogenous melt is eventually achieved. Although the traditional uncontrolled reactions may still occur on a limited level between the portions of the batch components A, B and C that were not selectively combined, these reactions are proportionally reduced and do not significantly reduce the improved melting efficiency, for example, by forming low viscosity phases within the melt which cause segregation.

Figure 5:
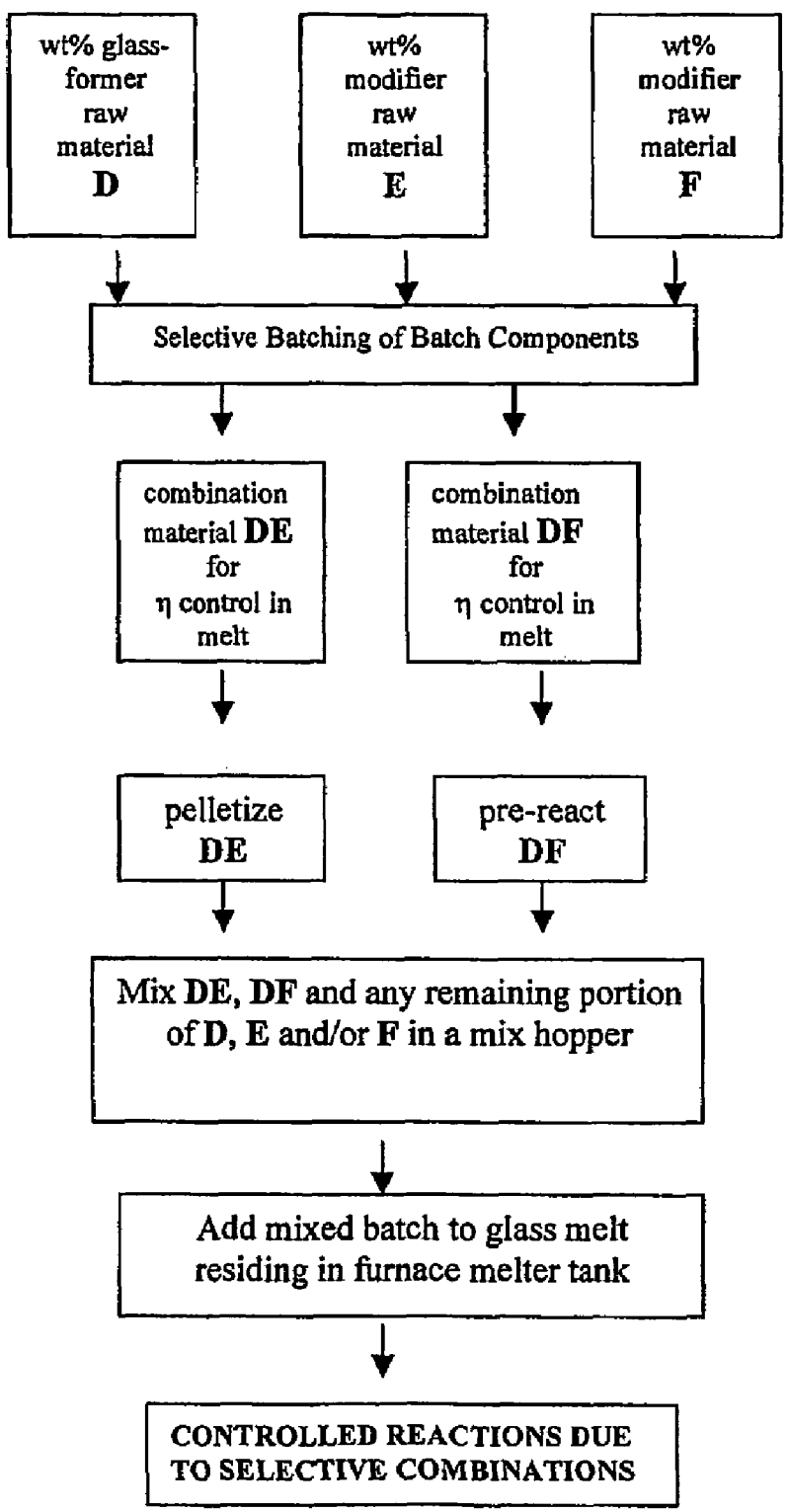
FIG. 5 is a flow diagram illustrating a second embodiment of the selective glass batching method according to the present invention.

As shown in the flow diagram in FIG. 5, another embodiment of the present invention is directed to narrowing the melting point range of the batch constituents by selectively combining a first portion of the batch components such that the selective combination exhibits the desired rheological properties (i.e., increased viscosity) in the molten phase formed during the narrowed melting point range. Additionally, a second portion of the batch components are selectively combined such that the selective combination also exhibits the desired rheological properties (i.e., increased viscosity) in the molten phase formed during the narrowed melting point range.

FIG. 5 shows that the batch recipe calls for a specified wt % of glass-former D, modifier E and modifier F. At least a portion of glass-former D and at least a portion of modifier E are selectively combined on a wt % basis to form a first combination material DE that will have a melting temperature $T_{DE}$ in a range of 60-90% of the resident melt temperature $T_m$ and a viscosity $\eta_{DE} \geq$ the resident melt viscosity $\eta_m$. Similarly, at least another portion of glass-former D and at least a portion of modifier F are selectively combined on a wt % basis to form a second combination material DF that will have a melting temperature $T_{DE}$ in a range of 60-90% of the resident melt temperature $T_m$ and a viscosity $\eta_{DF} \geq$ the resident melt viscosity $\eta_m$. The first combination material DE is pelletized, as described above, and the second combination material DF is pre-reacted.

Pre-reacting the selectively combined batch components involves heating the selected components to a temperature proximate a reaction temperature to form an intermediate reaction product. This reaction temperature and the intermediate reaction product formed will vary depending upon the batch components selected and the proportions chosen. The reaction product is cooled and ground into a particulate form, which can then be further processed (i.e., pelletized as described above) or added to the batch mixture in particulate form. Controlling the particle size distribution, i.e., minimizing the particle size of the selectively combined particulate intermediate material, further improves the melting efficiency by increasing the effective surface area available to contribute to the melting reactions when introduced into the melter. That is, since the particulate material disperse and react with greater speed and homogeneity than traditional coarse grain batch component raw materials, melting efficiency can be improved and any segregation can be further prevented when the particulates are selectively combined according to the present invention.

Pelletized DE, pre-reacted particulate DF and any remaining portions of D, E and/or F are then mixed, for example, in a mix hopper and added to the melter. It should also be noted that DE and DF can also be pre-melted. Controlled reactions occur in the melter at various temperatures between the selectively combined batch raw material components DE, DF and the resident melt, until a substantially homogenous melt is eventually achieved. Although the traditional uncontrolled reactions may still occur on a limited level between the portions of the batch components D, E and F that were not selectively combined, these reactions are proportionally reduced and do not significantly counter the benefits of improved melting efficiency associated with the present invention or contribute to forming low viscosity phases within the melt which can cause segregation.

One of ordinary skill in the art should realize the combinations and proper proportions of each batch component needed to result in the desired intermediate reaction product according to the present invention. Although the present invention is applicable to any glass batch composition, a specific example relating to a soda lime silicate float glass composition is described herein below. Thus, in view of the present invention, one of ordinary skill in the art should understand which of the various constituents of the glass batch should be combined to reduce the formation of low viscosity intermediate phases based on the desired application and the particular compositional requirements for any type of glass (e.g., fiber-glass, container glass).

Figure 6:
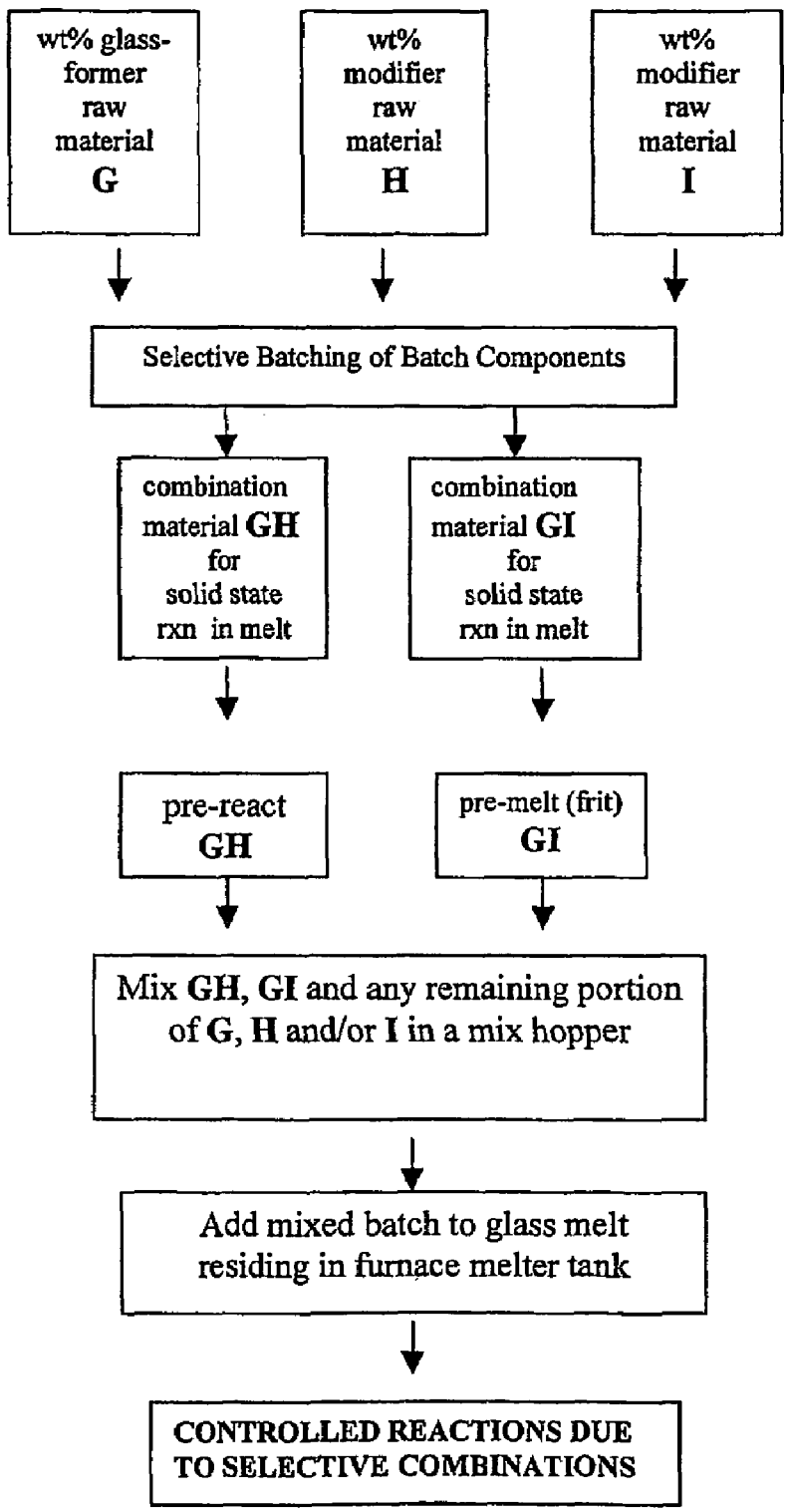
FIG. 6 is a flow diagram illustrating a third embodiment of the selective glass batching method according to the present invention.

As shown in the flow diagram in FIG. 6, another embodiment of the present invention is directed to selectively combining a portion of the raw material batch components such that the selective combinations have a specific reaction temperature range wherein an intermediate compound is formed via a solid state reaction between the combination and the resident melt. FIG. 6 shows that the batch recipe calls for a specified wt % of glass-former G, modifier H and modifier I. At least a portion of glass-former G and at least a portion of modifier H are selectively combined on a wt % basis to form a first combination material GH will have a reaction temperature $T_{GH}$ in a range of 60-100% of the resident melt temperature $T_m$ such that melt homogenization will occur via solid state reactions rather than by melting the second combination material GH. Similarly, at least another portion of glass-former G and at least a portion of modifier I are selectively combined on a wt % basis to form a second combination material GI that will have a reaction temperature $T_{GI}$ in a range of 60-100% of the resident melt temperature $T_m$ such that melt homogenization will occur via solid state reactions rather than by melting the second combination material GI. The first combination material GH is pre-reacted, as described above, and the second combination material GI is pre-melted into a frit.

Pre-melting the selective combinations involves heating the selected batch components to a temperature proximate the melting temperature of the system, allowing time for homogenization, and then quenching the melted combination material to form a frit having the composition based on the selected combination. Again, one of ordinary skill in the art would realize the combinations and proper proportions of each batch component and the required melting temperatures needed to result in the desired pre-melted frit feed stock material.

Pre-reacted particulate GH, pre-melted frit GI and any remaining portions of G, H and/or I are then mixed, for example, in a mix hopper, and then added to the melter. It should also be noted that GH and GI can also be pelletized. Controlled solid state reactions occur in the melter at various temperatures between the selectively combined batch raw material components GH, GI and the resident melt, until a substantially homogenous melt is eventually achieved. Although the traditional uncontrolled reactions may still occur on a limited level between the portions of the batch components G, H and I that were not selectively combined, these reactions are proportionally reduced and do not significantly counter the improved melting efficiency or contribute to forming low viscosity phases within the melt which can cause segregation.

It should also be noted that the raw materials from which the batch components are selected can be oxides, carbonates, hydroxides, chlorides, sulfates, nitrates, or mixed industrial minerals such as feldspars or clays. In order to reduce the potential for harmful byproduct emissions, however, it is desired that the intermediate products formed by the selectively pre-batched combinations do not produce gasses such as $SO_x$ and $NO_x$ as a result of the melting and fining process.

EXAMPLE

Figure 8:
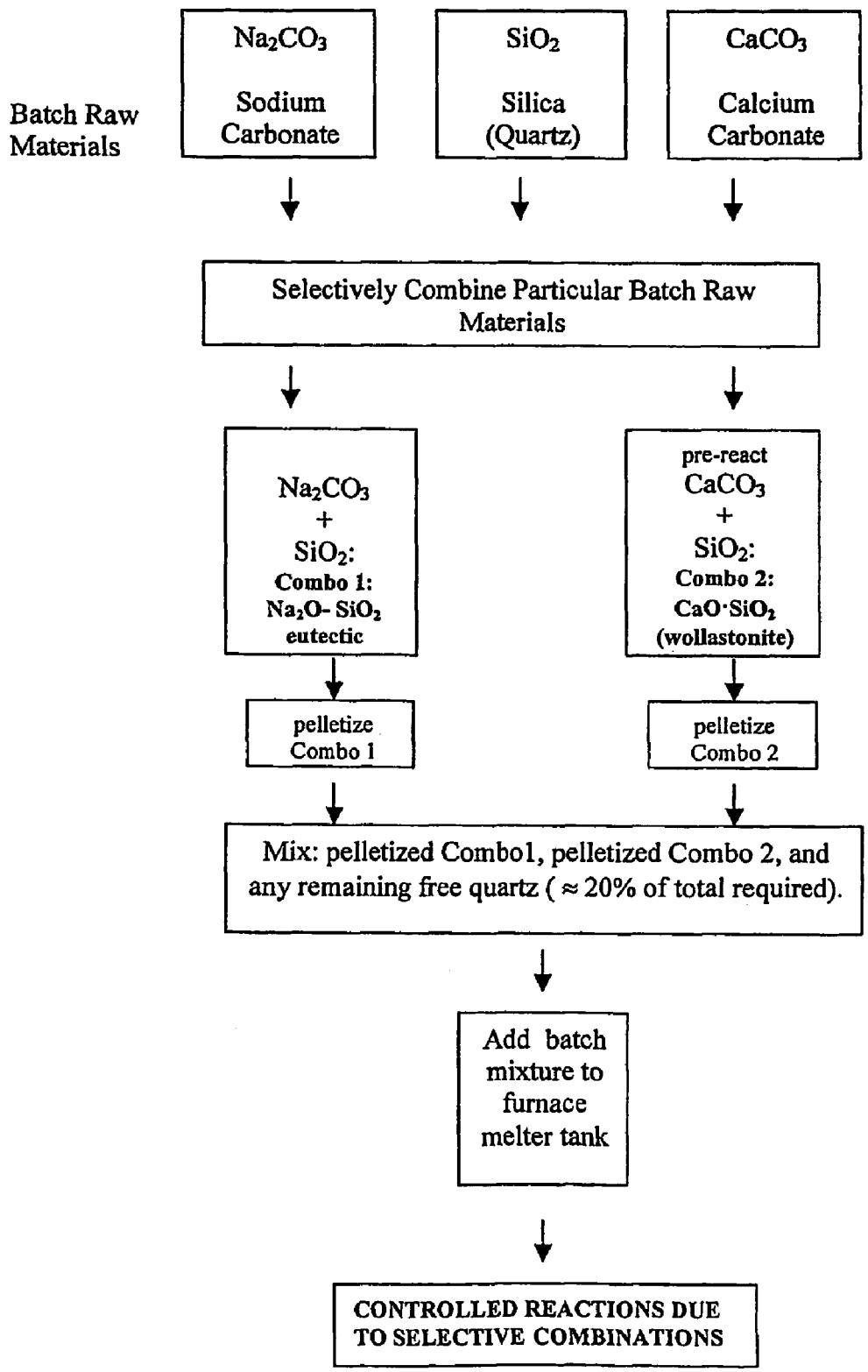
FIG. 8 is a flow diagram illustrating the selective batching method according to the example.

The following example is particularly directed to a float glass composition and melting scenario. FIG. 8 is a flow diagram illustrating the selective batching method according to the example. Traditional batch components of $Na_2CO_3$, $CaCO_3$, and $SiO_2$ are provided. Instead of simply mixing all of these raw material components together, however, specific combinations of these raw materials are selectively pre-batched.

That is, $Na_2CO_3$ is selectively batched with quartz in the eutectic proportions of the $Na_2O$-$SiO_2$ system to provide a first combination material to minimize the possibility of low viscosity liquid formation by preventing the eutectic reaction of $Na_2CO_3$ with other raw materials (such as $CaCO_3$) that ordinarily occurs absent the selective batching according to the present invention. $CaCO_3$ is selectively combined and pre-reacted with quartz to form a second combination material (i.e., an intermediate reaction product). In this case, the second combination material is wollastonite ($CaO.SiO_2$), which will not melt after being mixed with the first combination material and remaining batch components (e.g., free quartz) and being introduced into the melt. Instead, the wollastonite interacts with the melt and the other batch components via a solid-state reaction.

Figure 7:
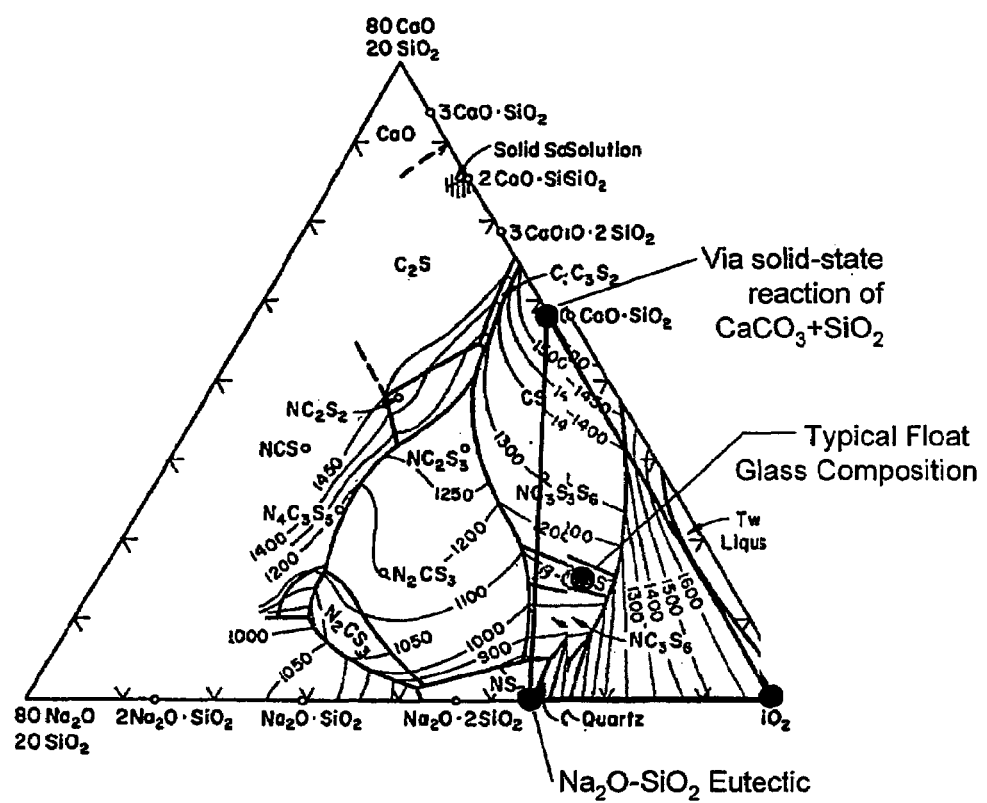
FIG. 7 is a ternary phase diagram of a selectively combined glass batch sub-system according to the example based on a commercial float glass composition.

These first and second combination materials are each pelletized and mixed with the remaining amount of quartz (approximately less than 20% of the total batch) prior to being introduced into the melt and beginning the melting process. As shown in the phase diagram in FIG. 7, the reaction sequence during the melting process is altered to prevent gross segregation of the batch components, and intermediate reaction products (e.g., the $Na_2O$—$SiO_2$ eutectic and synthetic wollastonite) are created. That is, $SiO_2$, the $Na_2O$—$SiO_2$ eutectic and synthetic wollastonite ($CaO.SiO_2$) comprise a sub-system and the amount of free quartz which is not selectively combined with another material is reduced to less than 20%. Thus, reducing the amount of silica added to the glass furnace as quartz, or adding a majority of the quartz intimately mixed with a more reactive species, improves melting efficiency and also reduces the tendency for the above-described segregation problem.

That is, the melting point of the $Na_2O$—$SiO_2$ eutectic is 785° C. (1058 K), which is within a range of 60-90% of the overall temperature of the resident melt (on the order of 1400° C.; 1673 K). The viscosity of the $Na_2O$—$SiO_2$ eutectic is on the order of 1000 mPa.s (1000 centipoise), which is approximately 7% of the viscosity of the resident melt. Since wollastonite has a melting point of 1550° C., wollastonite will not melt per se, even at a resident melt temperature on the order of 1400° C. Instead, the batch is homogenized within the melt via solid state reactions at temperatures within 60-100% of the resident melt temperature which improves melting efficiency and prevents the formation of a low viscosity liquidous phases that promote batch segregation. It should be noted, however, that the temperatures within the glass tank exceed the temperature of the resident melt. For example, it is not uncommon for glass tank temperatures to range from 1300 to 1500° C. for a glass with a melting point of 1100° C.

It should also be noted that the second combination material according to the example could also be selectively combined and pelletized without actually pre-reacting and thus not forming wollastonite until the reaction temperature range is reached within the melt. At that time, instead of melting, the solid state reaction forming wollastonite occurs and the solid state interactions with the melt follow, while the tendency for a low viscosity liquid is still reduced.

As shown and described above, since the combination materials (and intermediate reaction products) react more easily in specified sub-systems than traditional raw material batch components react in a traditional system, the overall energy needs and time required to form a homogeneous melt are significantly reduced. This keeps diffusion distances short, substantially reduces the time required for melting and homogenization, reduces fining times and can reduce the tendency for large scale segregation. Alternatively, due to the reduced reaction time, additional fining time could be provided in the current furnace setup (assuming a constant residence time is maintained), which further eliminates the potential for seeds and further improves the overall homogeneity of the melt, resulting in higher quality glass products.

While the present invention is useful for improving melting efficiency by reducing the tendency for batch component raw materials to segregate within the melt, the methodology and benefits of the present invention are equally applicable for glass systems that are not necessarily subject to gross segregation problems. That is, selectively combining batch components according to the present invention enables improved melting efficiency, material efficiency and fuel efficiency as described above, even in the absence of gross segregation.

While the present invention has been particularly shown and described with reference to the preferred mode as illustrated in the drawings, it will be understood by one skilled in the art that various changes in detail may be effected therein without departing from the spirit and scope of the invention as defined by the claims.

I claim:

1. A method of controlling the reaction paths of glass batch components added to a glass melt residing in a glass melter, said glass melt having a melt viscosity $\eta_m$ at a resident melt temperature $T_m$ (K), comprising the steps of: providing a plurality of raw material batch components in amounts according to a batch recipe, said plurality of raw material batch components comprising at least one glass-former material and at least one of a modifier material; combining a first portion of said plurality of raw material batch components to provide a first combination material having a melting temperature which is in a range of 60 to 90% of said resident melt temperature $T_m$ and a viscosity at said melting temperature that is greater than or equal to said melt viscosity $\eta_m/100$; combining a second portion of said plurality of raw material batch components to provide a second combination material having a reaction temperature in a range of 60 to 100% of said resident melt temperature, such that said second combination material is capable of forming an intermediate compound via a solid state reaction prior to reacting with said glass melt; mixing said first combination material, said second combination material and any remaining portion of said plurality of raw material batch components to form a batch mixture; and introducing said batch mixture into the glass melter.

2. The method of claim 1, wherein said first combination material comprises a first plurality of discrete reaction members.

3. The method of claim 1, wherein said second combination material comprises a second plurality of discrete reaction members.

4. The method of claim 1, wherein said first combination material is a pre-reacted to a temperature proximate a specific reaction temperature of said first combination material, cooled and ground to form a plurality of pre-reacted particulates prior to said mixing step.

5. The method of claim 1, wherein said second combination material is pre-reacted, and ground to form a plurality of pre-reacted particulates prior to said mixing step.

6. The method of claim 1, wherein said first combination material comprises a frit.

7. The method of claim 1, wherein said second combination material comprises a frit.

8. The method of claim 1, wherein said plurality of raw material batch components further comprise an intermediate material.

9. The method of claim 1, wherein said first combination material comprises at least a portion of at least one of said glass-former material and at least a portion of at least one of said modifier material.

10. The method of claim 1, wherein said second combination material comprises at least a portion of at least one of said glass-former material and at least a portion of another of said modifier material.

11. The method of claim 8, wherein said first combination material comprises at least a portion of said intermediate material and at least a portion of at least one of said modifier material.

12. The method of claim 11, wherein said second combination material comprises at least a portion of at least one of said glass-former material and at least a portion of at least one of said modifier material.

13. The method of claim 1, wherein said first combination material comprises a first plurality of discrete reaction members and said second combination material comprises a second plurality of discrete reaction members.

14. The method of claim 1, wherein said first combination material comprises a first plurality of discrete reaction members and said second combination material comprises a second pre-reacted material.

15. The method of claim 1, wherein said first combination material comprises a first plurality of discrete reaction members and said second combination material comprises a second frit.

16. The method of claim 1, wherein said first combination material comprises a first pre-reacted material and said second combination material comprises a second plurality of discrete reaction members.

17. The method of claim 1, wherein said first combination material comprises a first pre-reacted material and said second combination material comprises a second pre-reacted material.

18. The method of claim 1, wherein said first combination material comprises a first pre-reacted material and said second combination material comprises a second frit.

19. The method of claim 1, wherein said first combination material comprises a first kit and said second combination material comprises a second plurality of discrete reaction members.

20. The method of claim 1, wherein said first combination material comprises a first kit and said second combination material comprises a second pre-reacted material.

21. The method of claim 1, wherein said first combination material comprises a first kit and said second combination material comprises a second frit.

22. A method of controlling the reaction paths of glass batch components added to a glass melt residing in a glass melter, said glass melt having a melt viscosity $\eta_m$ at a resident melt temperature $T_m$ (K), comprising the steps of; providing a plurality of raw material batch components in amounts according to a batch recipe, said plurality of raw material batch components comprising at least one of a glass-former material and at least one of a modifier material; selectively combining a first portion of said plurality of raw material batch components to provide a first combination material having a melting temperature in a range of 60 to 90% of said resident melt temperature $T_m$ and a viscosity at said melting temperature that is greater than or equal to said melt viscosity $\eta_m/100$; mixing said first combination material and a remaining portion of said plurality of raw material batch components to form a batch mixture; and introducing said batch mixture into the glass melter.

23. The method of claim 22, further comprising a step of selectively combining a second portion of said plurality of raw material batch components to provide a second combination material having a melting temperature which is in a range of 60 to 90% of said resident melt temperature $T_m$ and a viscosity at said melting temperature that is greater than or equal to said melt viscosity $\eta_m/100$.

24. The method of claim 22, wherein said first combination material comprises a first plurality of discrete reaction members.

25. The meted of claim 23, wherein said second combination material comprises a second plurality of discrete reaction members.

26. The method of claim 22, wherein said first combination material comprises a first pre-reacted material.

27. The method of claim 23, wherein said second combination material comprises a second pre-reacted material.

28. The method of claim 22, wherein said first combination material comprises a first frit.

29. The method of claim 23, wherein said second combination material comprises a second frit.

30. The method of claim 22, wherein said plurality of raw material batch components further comprise an intermediate material.

31. The method of claim 23, wherein said plurality of raw material batch components further comprise an intermediate material.

32. The method of claim 22, wherein said first combination material comprises at least a portion of at least one of said glass-former material and at least a portion of at least one of said modifier material.

33. The method of claim 23, wherein said second combination material comprises at least a portion of at least one of said glass-former material and at least a portion of another of said modifier material.

34. The method of claim 30, wherein said first combination material comprises at least a portion of said intermediate material and at least a portion of at least one of said modifier material.

35. The method of claim 31, wherein said second combination material comprises at least a portion of at least one of said glass-former material and at least a portion of at least one of said modifier material.

36. The method of claim 23, wherein said first combination material comprises a first plurality of discrete reaction members and said second combination material comprises a second plurality of discrete reaction members.

37. The method of claim 23, wherein said first combination material comprises a first plurality of discrete reaction members and said second combination material comprises a second pre-reacted material.

38. The method of claim 23, wherein said first combination material comprises a first plurality of discrete reaction members and said second combination material comprises a second flit.

39. The method of claim 23, wherein said first combination material comprises a first pre-reacted material and said second combination material comprises a second plurality of discrete reaction members.

40. The method of claim 23, wherein said first combination material comprises a first pre-reacted material and said second combination material comprises a second pre-reacted material.

41. The method of claim 23, wherein said first combination material comprises a first pre-reacted material and said second combination material comprises a second frit.

42. The method of claim 23, wherein said first combination material comprises a first frit and said second combination material comprises a second plurality of discrete reaction members.

43. The method of claim 23, wherein said first combination material comprises a first frit and said second combination material comprises a second pre-reacted material.

44. The method of claim 23, wherein said first combination material comprises a first frit and said second combination material comprises a second frit.

* * * * *